United States Patent [19]

Nerurkar et al.

[11] 4,274,025

[45] Jun. 16, 1981

[54] POLYESTER FILMS CONTAINING SUBSTANTIALLY SPHERICAL PARTICLES USEFUL AS SLOT LINERS

[75] Inventors: Mohanlal S. Nerurkar, Welwyn Garden City; Peter G. Knowles, Luton, both of England

[73] Assignee: Imperial Chemical Industries Limited, London, England

[21] Appl. No.: 27,841

[22] Filed: Apr. 6, 1979

Related U.S. Application Data

[63] Continuation of Ser. No. 781,870, Mar. 28, 1977, abandoned.

[30] Foreign Application Priority Data

Apr. 29, 1976 [GB] United Kingdom ............... 17489/76

[51] Int. Cl.$^3$ .......................... C08K 3/36; H02K 3/34
[52] U.S. Cl. .................................. 310/215; 260/40 R;
428/480
[58] Field of Search ...................... 310/215; 260/40 R;
428/480

[56] References Cited

U.S. PATENT DOCUMENTS

| | | | |
|---|---|---|---|
| 2,819,173 | 1/1958 | Dithmar | 106/166 |
| 3,201,506 | 8/1965 | Bills | 264/210 |
| 3,419,460 | 12/1968 | Ure | 260/40 |
| 3,514,651 | 5/1970 | Jarrett et al. | 260/40 |
| 3,884,870 | 5/1975 | Dodson | 260/40 |

FOREIGN PATENT DOCUMENTS

| | | |
|---|---|---|
| 1264746 | 3/1968 | Fed. Rep. of Germany . |
| 2358456 | 6/1974 | Fed. Rep. of Germany . |
| 877541 | 9/1961 | United Kingdom . |
| 951768 | 3/1964 | United Kingdom . |
| 1090036 | 11/1967 | United Kingdom . |
| 1096064 | 12/1967 | United Kingdom . |
| 1105119 | 3/1968 | United Kingdom . |
| 1130947 | 10/1968 | United Kingdom . |
| 1459810 | 12/1976 | United Kingdom . |

*Primary Examiner*—James C. Cannon
*Attorney, Agent, or Firm*—Cushman, Darby & Cushman

[57] ABSTRACT

Polyester films containing 0.2 to 0.9% by weight of filler particles having a nominal particle size of 2 to 10 $\mu$m and a hardness of 2.5 to 7 on the moh scale are suitable for the production of slot liners and closures. The films have improved resistance to fibrillation or delamination and tearing during the formation of the slot liners and closures and improved slip properties to promote their insertion into electrical stators and rotors.

9 Claims, No Drawings

POLYESTER FILMS CONTAINING SUBSTANTIALLY SPHERICAL PARTICLES USEFUL AS SLOT LINERS

This is a continuation of application Ser. No. 781,870, filed Mar. 28, 1977, and now abandoned.

The present invention relates to films or sheets of linear polyesters and to shaped articles, such as insulators for electrical machines, which may be produced by stamping from such films or sheets.

Linear polyester films and sheets have outstanding dielectric properties and are suitable for the electrical insulation of stators and rotors used in electrical machines, such as electric motors, dynamos, generators and alternators, when shaped by stamping and also by folding or bending into slot liners and slot closures for insertion into slots formed in the stators and rotors. Slot liners serve the double purpose of electrically insulating the electrical conductors inserted into the slots from the core material of the stator or rotor and also protecting the conductors from damage during their insertion into the slots. Slot closures are inserted into the slots to retain the conductors.

Slot closures formed from known polyethylene terephthalate films sometimes fail to be completely inserted into the slots of the core material when insertion is accomplished with automatic machinery, resulting not only in unsatisfactory electrical insulation but also in the risk of damaging the insertion machinery. Applicants have ascertained that these difficulties are associated with the surface characteristics of the film and especially its rather high coefficient of friction.

Films used for the production of slot liners and closures should also desirably be resistant to delamination, fibrillation and tearing during the stamping and folding or bending operation employed in their production.

The Applicants have now discovered that linear polyester films or sheets containing particles of an inert inorganic material having a unique combination of characteristics exhibit a surprising combination of properties namely improved resistance to fibrillation, delamination and tearing and a lower coefficient of friction such that they are suitable for the production of shaped articles such as slot liners or closures which may be inserted into the slots of electrical stators and rotors without substantial difficulty.

According to the present invention a film or sheet of a linear polyester contains particles of an inert inorganic material present in an amount ranging from 0.2 to 0.9% by weight based on the weight of the linear polyester, said particles having a nominal particle size ranging from 2 to 10 microns (hereinafter "$\mu$m") and a hardness measured on the moh scale ranging from 2.5 to 7.

The term "nominal particle size" used herein relates to that size of particle, determined as the size of the particle in its greatest dimension, at which 70% by number of the particles in the particulate material have a size equal to and less than that size. Particle sizes may be measured by electron microscope, Coulter counter or sedimentation analysis and the nominal particle size may be determined by plotting a cumulative distribution curve representing the percentage of particles equal to or smaller than a number of predetermined particle sizes.

Polyester films or sheets containing particles as defined above have surface slip properties defined by static and kinetic coefficients of friction ranging respectively from 0.30 to 0.38 and 0.27 to 0.36, preferably 0.31 to 0.35 and 0.29 to 0.33. Such slip or frictional properties are believed to result from a surface roughness imposed by the particles near the surface of the film or sheet. Particles in amounts and nominal particle sizes outside the ranges 0.2 to 0.9% by weight and 2 to 10 $\mu$m respectively either do not render the film surface sufficiently rough to promote a satisfactory sliding action or make it too rough so that the protrusions tend to interlock with those on the surface of similar films or on the surface of other materials. It has also been found that films containing more than about 1.0% of particles are susceptible to tearing.

The films and sheets of the present invention preferably have a thickness of at least 50 $\mu$m, and especially in the range 125 to 500 $\mu$m.

The films and sheets of this invention may be fabricated into shaped articles. The invention therefore also relates to shaped articles produced from such films or sheets, especially articles which are produced by stamping and optionally also folding the films or sheets. Slot liners and closures for electrical stators and rotors are especially effective when made from the films and sheets according to this invention.

The invention also relates to a process for the production of a slot liner or slot closure for an electrical machine wherein the slot liner or slot closure is cut and shaped from a film or sheet of a linear polyester containing particles of an inert inorganic material present in an amount ranging from 0.2 to 0.9% by weight based on the weight of the linear polyester, said particles having a nominal particle size ranging from 2 to 10 $\mu$m and a hardness measured on the moh scale ranging from 2.5 to 7. The slot liners and closures may be produced without delamination, fibrillation or tearing and may be inserted into the slots of electrical stators and rotors without the difficulties associated with films or sheets having high surface coefficients of friction. Slot liners and closures are preferably stamped from films or sheets having thicknesses in the range 125 to 500 $\mu$m, and especially 175 to 350 $\mu$m.

The static and kinetic coefficients of friction of the films and sheets expressed herein are assessed by procedure B of ASTM test D 1894-73 with the modifications that (a) the film or sheet is not wrapped around the sled but loaded by placing the sled over it and moving the sled and film or sheet by means of a multi-strand copper wire attached directly to the film or sheet, (b) the sled which is the same as that specified in ASTM test D 1894-73 is further loaded by the addition of a 1 kg weight and (c) the loaded sled and film are moved at a uniform speed of 20 cm/minute.

The linear polyester from which the films or sheets may be produced may comprise those polyesters which may be obtained by condensing one or more dicarboxylic acids or their lower alkyl diesters, e.g. terephthalic acid, isophthalic, phthalic, 2,5-, 2,6- and 2,7-naphthalene dicarboxylic acid, succinic acid, sebacic acid, adipic acid, azelaic acid, diphenyl dicarboxylic acid, and hexahydroterephthalic acid or bis-p-carboxyl phenoxy ethane, optionally with a monocarboxylic acid, such as pivalic acid, with one or more glycols, e.g. ethylene glycol, 1,3-propanediol, 1,4-butanediol, neopentyl glycol and 1,4-cyclohexane-dimethanol. Polyethylene terephthalate is particularly useful for the production of the films or sheets according to the invention.

The films or sheets are preferably biaxially oriented and heat set by techniques known in the art, for instance as described in British patent specification No. 838,708. Biaxially oriented films of polyethylene terephthalate containing particulate materials of the characteristics specified above have particularly effective properties when heat set at temperatures in the range from 210° to 240° C., preferably about 225° C.

The particles incorporated into the polyester film or sheet should preferably be inert, i.e. not chemically reactive with the polyester or any of the materials from which it is produced or any other additives it may contain, and may comprise any suitable material such as one or more of natural or synthetic silica, glass beads, calcium borate, calcium or magnesium carbonate, barium sulphate, calcium or aluminium silicate, or aluminium trihydrate. Particularly effective slip properties are achieved when the particles are substantially spherical in shape. Preferably the film or sheet comprises substantially spherical particles of a synthetic silica.

Particles having a preferred nominal particle size of about 5 μm are particularly effective. Preferably the particles have a hardness of about 5 on the moh scale. Particles having a hardness exceeding 7 on the moh scale tend to be abrasive to film-forming and handling machinery.

Generally it is preferred to use an amount of particles not exceeding about 0.5% by weight based on the weight of the linear polyester since greater amounts do not result in a significant modification of the coefficients of friction of the film or sheet.

It is generally preferred to incorporate the particles into the polyester during its production by polymerisation. A convenient procedure is to add the particles to the polycondensation mixture used for the production of the polyester. The particles may, for example, be added as a slurry in the glycol from which the polyester is formed prior to the commencement of polycondensation.

Some particulate materials which are commercially available have an average particle size greater than the maximum size of 10 μm specified according to the invention. The size of such particles may be reduced to a suitable average particle size within the range 2 to 10 μm by any known process such as ball milling with the glycol from which the film is derived.

Other additives such as pigments having a particle size smaller than 2 μm, e.g. titanium dioxide, may if desired be included in the polyester film or sheet.

Slot liners and closures may be produced from the films and sheets according to this invention by known techniques. For example, slot closures may be produced from narrow strips of film or sheet which are cut to the required length and then formed into a channel-shaped cross-section by means of a punch and die. Slot liners may be produced by bending the edge margins of a tape of polyester film or sheet inwardly to form cuffs at the edge of the tape and cutting the cuffed tape to size with a stamping die of appropriate size prior to bending transversely to the cuffed edges into a configuration suitable for insertion into the slots of the electrical stators and rotors. This procedure is illustrated in a booklet entitled "'Melinex' polyester film, Industry Note MX202, Electrical" published by Imperial Chemical Industries Limited, January 1975.

The invention is further illustrated by the following examples:

COMPARATIVE EXAMPLE 1

A 20% by weight slurry with ethylene glycol of spherical titanium dioxide particles of nominal particle size 0.5 μm and hardness 6.5 on the moh scale was milled for six hours in a ball mill. The slurry was subjected to polycondensation under conventional conditions together with dimethyl terephthalate and ethylene glycol to yield polyethylene terephthalate containing 0.5% by weight of titanium dioxide based on the weight of the polymer.

The resulting polymer was extruded into film, molecularly oriented by stretching in sequence in mutually perpendicular directions at draw ratios of about 2.9:1 in each direction in a conventional manner and heat set at about 225° C. to provide a film of thickness about 250 μm.

The film had a static and kinetic coefficient of friction respectively of 0.41 and 0.39 as indicated in Table 1 and tended on occasions to be incompletely inserted into the slots of electrical machines when formed into slot liners and slot closures.

COMPARATIVE EXAMPLE 2

Polyethylene terephthalate containing no particulate filler was extruded into film and molecularly oriented by stretching in sequence in mutually perpendicular directions at draw ratios of about 2.9:1 in each direction followed by heat setting at about 225° C. The resulting film had a thickness of about 250 μm and static and kinetic coefficients of friction respectively of 0.50 and 0.40. The film exhibited a tendency to delaminate and fibrillate when made into slot liners and closures.

EXAMPLES 1 TO 7 AND COMPARATIVE EXAMPLES 3 AND 4

For each example, a 20% by weight slurry with ethylene glycol of equal amounts of weight of titanium dioxide particles of nominal particle size 0.5 μm and the particles specified for each of the Examples 1 to 7 in Table 1 was milled for six hours in a ball mill. The slurry was subjected to polycondensation under conventional conditions together with dimethyl terephthalate and ethylene glycol to yield polyethylene terephthalate containing 0.3% by weight of titanium dioxide and 0.3% by weight based on the weight of the polymer of other particles.

The resulting polymers were extruded, molecularly oriented and heat set by the procedure described in Comparative Example 1 to provide films of thickness 250 μm.

In Comparative Examples 3 and 4, films containing calcium carbonate and magnesium silicate particles were produced in a similar manner.

The characteristics of the particulate materials added in each example are shown in Table 1 together with the properties of the films. In addition to providing adequate slip properties such that the films could be inserted without "snagging" into the slots of electrical machines, the films were resistant to fibrillation, delamination and tearing when cut and shaped into slot liners and closures. By comparison, the films of Comparative Examples 3 and 4 had higher coefficients of friction and tended to "snag" when inserted into the slots of electrical machines as slot liners or closures.

TABLE 1

| Example | Nature of particulate material | Nominal particle size after milling (μm) | Hardness of particles (moh scale) | Approximate shape of particles | Coefficient of friction Static | Coefficient of friction Kinetic |
| --- | --- | --- | --- | --- | --- | --- |
| 1 | synthetic silica | 6 | 5 | spherical aggregates | 0.34 | 0.29 |
| 2 | synthetic silica | 5 | 5 | spherical aggregates | 0.33 | 0.31 |
| 3 | synthetic silica | 3 | 5 | spherical aggregates | 0.33 | 0.32 |
| 4 | glass | 10 | 5.5 | spherical | 0.33 | 0.32 |
| 5 | magnesium carbonate | 6 | 3 | spherical | 0.35 | 0.34 |
| 6 | natural diatomaceous silica | 10 | 6 | plate-like | 0.36 | 0.35 |
| 7 | calcium silicate | 4 | 4.5 | acicular | 0.38 | 0.36 |
| Comparative 1 | titanium dioxide | 0.5 | 6.5 | spherical | 0.41 | 0.39 |
| Comparative 3 | calcium carbonate | <2 | 3 | spherical | 0.40 | 0.38 |
| Comparative 4 | magnesium silicate | 7 | 1 | plate-like | 0.43 | 0.41 |

EXAMPLES 8 TO 11 AND COMPARATIVE EXAMPLES 5 AND 6

The procedure of Example 1 was repeated to produce films of thickness 350 μm. In each example a mixture of silica and 0.3% by weight based on the weight of polyester of titanium dioxide particles having a nominal particle size of 0.5 μm and a hardness of 6.5 on the moh scale was included in the film polymer as indicated in Table 2 which also records the properties of the films. In Table 2 the following designations relate to the silica particles:

"Silica A"
  a synthetic silica comprising spherical aggregates of hardness 5 on the moh scale and of nominal particle size 8 μm after milling.

"Silica B"
  a diatomaceous silica comprising plate-like particles of hardness 6 on the moh scale and of nominal particle size 10 μm after milling.

For the delamination and fibrillation properties recorded in Table 2, "pass" means that the films were resistant to delamination and fibrillation and "fail" means that the films delaminated and fibrillated when cut and shaped into slot liners and closures.

TABLE 2

| Example | Nature | Amount % by weight based on the weight of polyester | Coefficient of friction Static | Coefficient of friction Kinetic | Delamination and fibrillation properties |
| --- | --- | --- | --- | --- | --- |
| Comparative 5 | Silica B | 0.1 | 0.39 | 0.38 | Fail |
| 8 | " | 0.2 | 0.37 | 0.35 | Pass |
| 9 | " | 0.3 | 0.35 | 0.33 | Pass |
| Comparative 6 | Silica A | 0.1 | 0.39 | 0.37 | Fail |
| 10 | " | 0.2 | 0.35 | 0.34 | Pass |
| 11 | " | 0.3 | 0.34 | 0.31 | Pass |

The surface slip properties of the films produced in Examples 8 to 11 enabled slot liners and closures produced therefrom to be inserted into the slot of electrical machines smoothly and efficiently.

We claim:

1. A slot liner or slot closure for an electrical machine produced from a film or sheet of a linear polyester which contains particles of an inert inorganic material present in an amount ranging from 0.2 to 0.9% by weight based on the weight of the linear polyester, said particles having a substantially spherical shape and a nominal particle size ranging from 3 to 10 μm and a hardness measured on the moh scale ranging from 2.5 to 7, said slot liner or slot closure having a static coefficient of friction in the range 0.30 to 0.38 and a kinetic coefficient of friction in the range of 0.27 to 0.36.

2. A slot liner or slot closure according to claim 1, in which the linear polyester is polyethylene terephthalate.

3. A slot liner or slot closure according to claim 1, in which the particles comprise a synthetic silica.

4. A slot liner or slot closure according to claim 1, in which the particles have a hardness of about 5 on the moh scale.

5. A slot liner or slot closure according to claim 1, in which the particles are present in an amount not exceeding about 0.5% by weight based on the weight of the linear polyester.

6. A slot liner or slot closure according to claim 1, produced from a film or sheet having a thickness in the range 175 to 350 μm.

7. A slot liner or slot closure for an electrical machine produced from a film or sheet of a linear polyester which contains particles of an inert inorganic material present in an amount ranging from 0.2 to 0.9% by weight based on the weight of the linear polyester, said particles having a substantially spherical shape and a nominal particle size of about 5 μm and a hardness measured on the moh scale ranging from 2.5 to 7, said slot liner or slot closure having a static coefficient of friction in the range 0.30 to 0.38 and a kinetic coefficient of friction in the range of 0.27 to 0.36.

8. A slot liner or closure for an electrical machine produced from a film or sheet of a linear polyester which contains particles of inert synthetic silica present in an amount not exceeding about 0.5% by weight based on the weight of the linear polyester, said particles having a substantially spherical shape and a nominal particle size ranging from 3 to 10 μm and a hardness of about 5 measured on the moh scale, said slot liner or slot closure having a static coefficient of friction in the range 0.30 to 0.38 and a kinetic coefficient of friction in the range of 0.27 to 0.36.

9. A process for the production of a slot liner or slot closure for an electrical machine in which the slot liner or slot closure is cut and shaped from a film or sheet of a linear polyester which contains particles of an inert inorganic material present in an amount ranging from 0.2 to 0.9% by weight based on the weight of the linear polyester, said particles having a substantially spherical shape and a nominal particle size ranging from 3 to 10 μm and a hardness measured on the moh scale ranging from 2.5 to 7.

* * * * *